United States Patent
Sun et al.

(10) Patent No.: US 11,480,490 B2
(45) Date of Patent: Oct. 25, 2022

(54) LARGE-SCALE HIGH-SPEED ROTARY EQUIPMENT MEASURING AND INTELLIGENT LEARNING ASSEMBLY METHOD AND DEVICE BASED ON VECTOR MINIMIZATION OF GEOMETRY CENTER, MASS CENTER, CENTER OF GRAVITY AND CENTER OF INERTIA

(71) Applicant: Harbin Institute of Technology, Harbin (CN)

(72) Inventors: Chuanzhi Sun, Harbin (CN); Jiubin Tan, Harbin (CN); Yongmeng Liu, Harbin (CN)

(73) Assignee: Harbin Institute of Technology, Harbin (CN)

( * ) Notice: Subject to any disclaimer, the term of this patent is extended or adjusted under 35 U.S.C. 154(b) by 874 days.

(21) Appl. No.: 16/375,117

(22) Filed: Apr. 4, 2019

(65) Prior Publication Data
US 2020/0217737 A1    Jul. 9, 2020

(30) Foreign Application Priority Data
Jan. 7, 2019  (CN) .......................... 201910012743.3

(51) Int. Cl.
*G01M 1/12* (2006.01)
*G01M 1/10* (2006.01)
(Continued)

(52) U.S. Cl.
CPC .............. *G01M 1/125* (2013.01); *G01M 1/10* (2013.01); *G01M 1/20* (2013.01); *G06N 3/08* (2013.01); *G06N 7/00* (2013.01)

(58) Field of Classification Search
CPC .......... G01M 1/125; G01M 1/10; G01M 1/20; G06N 3/08; G06N 7/00
See application file for complete search history.

(56) References Cited

U.S. PATENT DOCUMENTS 9,709,392 B2 *  7/2017 Wang ........................ F01D 5/30
9,890,661 B2 *  2/2018 Tan .......................... F01D 25/28
(Continued)

*Primary Examiner* — Peter D Nolan
*Assistant Examiner* — Wae L Louie
(74) *Attorney, Agent, or Firm* — IPRO, PLLC; Na Xu

(57) ABSTRACT

The present invention provides a large-scale high-speed rotary equipment measuring and intelligent learning assembly method and device based on vector minimization geometry center, mass center, the center of gravity and the center of inertia, belonging to the technical field of mechanical assembly. The method includes the steps of establishing a four-parameter circular profile measuring model for a single stage of rotor, simplifying the established four-parameter circular profile measuring model for the single stage of rotor, and establishing a four-target optimization model of the geometry center, mass center, the center of gravity and the center of inertia of multiple stages of rotors based on the angular orientation mounting position of each stage of rotor. The device include a base, an air flotation shaft system, an aligning and tilt regulating workbench, precise force sensors, a static balance measuring platform, an upright column, a lower transverse measuring rod, a lower telescopic inductive sensor, an upper transverse measuring rod and an upper lever type inductive sensor.

8 Claims, 2 Drawing Sheets

(51) Int. Cl.
    *G01M 1/20*     (2006.01)
    *G06N 3/08*     (2006.01)
    *G06N 7/00*     (2006.01)

(56) References Cited

U.S. PATENT DOCUMENTS

| | | | | |
|---|---|---|---|---|
| 10,331,044 | B2* | 6/2019 | Liu | G03F 7/20 |
| 10,760,448 | B2* | 9/2020 | Tan | G06N 3/02 |
| 10,794,790 | B2* | 10/2020 | Liu | G06N 3/04 |
| 11,385,120 | B2* | 7/2022 | Liu | B64F 5/60 |
| 2017/0167866 | A1* | 6/2017 | Wang | G01B 7/30 |
| 2017/0175584 | A1* | 6/2017 | Tan | F01D 25/285 |
| 2019/0033731 | A1* | 1/2019 | Liu | G03F 7/20 |
| 2020/0217211 | A1* | 7/2020 | Sun | F01D 25/04 |
| 2020/0217218 | A1* | 7/2020 | Tan | F02C 9/00 |
| 2020/0217223 | A1* | 7/2020 | Tan | F01D 25/285 |
| 2020/0217737 | A1* | 7/2020 | Sun | G06N 3/084 |
| 2020/0217738 | A1* | 7/2020 | Liu | G01M 1/16 |
| 2020/0217739 | A1* | 7/2020 | Liu | G06F 17/16 |
| 2020/0392907 | A1* | 12/2020 | Hall | F02C 9/266 |
| 2020/0393385 | A1* | 12/2020 | Hillel | F04D 27/001 |
| 2020/0394517 | A1* | 12/2020 | Hall | G06N 3/02 |
| 2022/0090907 | A1* | 3/2022 | Hu | G03F 7/70775 |

\* cited by examiner

LARGE-SCALE HIGH-SPEED ROTARY EQUIPMENT MEASURING AND INTELLIGENT LEARNING ASSEMBLY METHOD AND DEVICE BASED ON VECTOR MINIMIZATION OF GEOMETRY CENTER, MASS CENTER, CENTER OF GRAVITY AND CENTER OF INERTIA

TECHNICAL FIELD

The present invention relates to a large-scale high-speed rotary equipment measuring and intelligent learning assembly method and device based on vector minimization of the geometry center, mass center, the center of gravity and the center of inertia, belonging to the technical field of mechanical assembly.

BACKGROUND ART

Liu Daxiang, an academician of the Chinese Academy of Engineering, once said: "if the aircraft manufacture is likened to the industrial crown, the development of the engine is the jewel on the crown". A core engine serves as the heart of an aircraft engine, so that the assembly quality of the core engine directly influences the performance of the aircraft engine. The core engine is composed of a high-pressure compressor, a combustion chamber and a high-pressure turbine. The core engine is mainly formed by stacking multiple stages of rotors, and coaxiality and amount of unbalance are core parameters for checking the assembly quality of multiple stages of rotors. When the aircraft engine operates at working rotation speed (for an example, the working rotation speed of a commercial engine can generally reach 12000 rpm or higher), the unbalance response caused by assembly errors of multiple stages of rotors will be amplified, resulting in engine vibration and causing collision and friction between blades and a casing. Therefore, an assembly optimization method based on minimization of the geometry center, the mass center, the center of gravity and the center of inertia for assembly of multiple stages of rotors is urgently needed, to enhance the assembly quality of the aircraft engine, reduce the vibration of the engine and improve the performance of the engine. The existing optimization method mostly has the problems that the existing optimization method cannot provide a theoretical basis for optimization of the mass center, the center of gravity and the center of inertia after multi-stage rotor assembly, only considers optimization of concentricity in the multi-stage rotor assembly process, but ignores optimization of the mass center, the center of gravity and the center of inertia of the rotor in the assembly process, and the transmission and amplification effects of the circular profile measuring error and filtering error of the single stage of rotor in the assembly process, so that the four-target optimization of the geometry center, the mass center, the center of gravity and the center of inertia cannot be achieved.

SUMMARY OF THE INVENTION

In order to solve the technical problems in the prior art, the present invention provides a large-scale high-speed rotary equipment measuring and intelligent learning assembly method and device based on vector minimization of the geometry center, the mass center, the center of gravity and the center of inertia.

Specifically, a large-scale high-speed rotary equipment vector measuring stack assembly method based on vector minimization of the geometry center, the mass center, the center of gravity and the center of inertia adopts the following technical scheme and includes:

step 1: establishing a four-parameter circular profile measuring model for a single stage of rotor, and obtaining an actual sampling angle distribution function of large-scale high-speed rotary equipment by utilizing the four-parameter circular profile measuring model, wherein the actual sampling angle distribution function of the large-scale high-speed rotary equipment is:

$$\varphi_i = \theta_i + \arcsin\left(\frac{d + e\sin(\theta_i - \alpha)}{r + r_0\sqrt{\frac{\cos^2(\varphi_i - \beta)}{\cos^2\gamma} + \sin^2(\varphi_i - \beta)}}\right),$$

$$i = 1, 2, \ldots, n$$

where $\varphi_i$ is the sampling angle relative to the geometry center, $\theta_i$ is the sampling angle relative to the center of gyration, d is the offset of a sensor measuring head, e is the eccentricity of the rotor, $\alpha$ is the eccentric angle of the rotor, $r_0$ is the short axis of a fitted ellipse, r is the radius of the sensor probe, $\gamma$ is the included angle between an axis of gyration and a geometric axis, $\beta$ is the included angle between the projection of the geometric axis on a measuring plane and the initial direction of measuring, and n is the number of sampling points;

step 2: obtaining a morphological filter based on non-equal interval sampling angles by utilizing the envelope filter principle according to the four-parameter circular profile measuring model for the single stage rotor, taking any point $P_1$ in a two-dimensional point set S, and enabling the point $P_1$ as a start point and points which are less than $2\alpha$ from the point $P_1$ to constitute a subset $S_1$, wherein S is a two-dimensional space coordinate point set of circular profile sampling points, and $\alpha$ is an alpha disc radius;

step 3: taking any point $P_2$ in the subset $S_1$ to obtain two alpha discs which have a radius $\alpha$ and pass through the point $P_1$ and the point $P_2$, wherein the locus equation of the centers of inner and outer circles of the alpha discs is:

$$\begin{cases} \rho_0 = \sqrt{x_0^2 + y_0^2} \\ \varphi_0 = \arctan\frac{y_0}{x_0} \end{cases} \text{ or } \begin{cases} \rho_{0'} = \sqrt{x_{0'}^2 + y_{0'}^2} \\ \varphi_{0'} = \arctan\frac{y_{0'}}{x_{0'}} \end{cases}$$

where $P_0$ and $P_0'$ are the centers of circles of the two alpha discs respectively; and $$\begin{cases} x_0 = \rho_1\cos\varphi_1 + 0.5(\rho_2\cos\varphi_2 - \rho_1\cos\varphi_1) + H(\rho_2\sin\varphi_2 - \rho_1\sin\varphi_1) \\ y_0 = \rho_1\sin\varphi_1 + 0.5(\rho_2\sin\varphi_2 - \rho_1\sin\varphi_1) + H(\rho_1\cos\varphi_1 - \rho_2\cos\varphi_2) \end{cases}$$

$$\begin{cases} x_{0'} = \rho_1\cos\varphi_1 + 0.5(\rho_2\cos\varphi_2 - \rho_1\cos\varphi_1) + H(\rho_2\sin\varphi_2 - \rho_1\sin\varphi_1) \\ y_{0'} = \rho_1\sin\varphi_1 + 0.5(\rho_2\sin\varphi_2 - \rho_1\sin\varphi_1) + H(\rho_1\cos\varphi_1 - \rho_2\cos\varphi_2) \end{cases}$$

$$H = \sqrt{\frac{\alpha^2}{(\rho_1\cos\varphi_1 - \rho_2\cos\varphi_2)^2 + (\rho_1\sin\varphi_1 - \rho_2\sin\varphi_2)^2} - \frac{1}{4}}$$

$\rho_0$, $\varphi_0$, $\rho_{0'}$, $\varphi_{0'}$, $\rho_1$, $\varphi_1$, $\rho_2$ and $\varphi_2$ are polar diameters and polar angles of points $P_0$, $P_{0'}$, $P_1$ and $P_2$ in polar coordinates, respectively; $x_0$, $y_0$, $x_{0'}$ and $y_{0'}$ are coordinates of points $P_0$ and $P_{0'}$ in the X-axis direction and the Y-axis direction, respectively;

step 4: obtaining the relationship between an alpha envelope boundary $\partial H_\alpha(S)$ and sampling point polar coordinates $(\rho_i, \varphi_i)$ by utilizing the locus equation in step 3, and obtaining the circular profile information of the single stage of rotor according to the relationship between the alpha envelope boundary $\partial H_\alpha(S)$ and the sampling point polar coordinates $(\rho_i, \varphi_i)$;

step 5: when the eccentric error is $e/r_0 < 10^{-3}$ relative to the short axis of the fitted ellipse, performing power series expansion on the four-parameter circular profile measuring model for the single stage of rotor in step 1 so as to obtain a simplified four-parameter circular profile measuring model; the simplified four-parameter circular profile measuring model is:

$$\begin{cases} l_i = e\cos(\theta_i - \alpha) + \Delta r_i + \xi_i - \dfrac{(d + e\sin(\theta_i - \alpha))^2}{2(r + \Delta r_i + \xi_i)} \\ \xi_i = r_0 \sqrt{\dfrac{\cos^2(\eta_i)}{\cos^2\gamma} + \sin^2(\eta_i)} \qquad , i = 0, 1, 2, \ldots, n \\ \eta_i = \theta_i + \arcsin\left(\dfrac{d + e\sin(\theta_i - \alpha)}{r + r_0 + \Delta r_i}\right) - \beta \end{cases}$$

where $l_i$ represents the simplified four-parameter circular profile measuring model;

step 6: substituting the filtered circular profile data into the simplified four-parameter circular profile measuring model in step 5, accurately estimating the eccentric error of the single stage of rotor by utilizing the simplified four-parameter circular profile measuring model, and obtaining the eccentric error value of the single stage of rotor; then, establishing a four-target optimization model of the geometry center, the mass center, the center of gravity and the center of inertia of multiple stages of rotors based on the angular orientation mounting position of each stage of rotor by utilizing the vector stack projection theory according to the eccentric error value of the single stage of rotor;

step 7: inputting the rotor assembly result obtained by the four-target optimization model in step 6 into a BP neural network for prediction so as to compensate for the deviation between the model predicted value and the actual measured value.

Further, the four-parameter circular profile measuring model for the single stage of rotor in step 1 is:

$$l_i = \sqrt{(r + \Delta r_i + r_i)^2 - (d + e\sin(\theta_i - \alpha))^2} + e\cos(\theta_i - \alpha) - r, \; i = 0, 1, 2, \ldots, n$$

where $l_i$ is the distance between the sensor measuring head and the measuring center of gyration, $\Delta r_i$ is the surface processing error, $r_i$ is the distance between the ith sampling point of the fitted ellipse and the geometric center, and the specific expression is:

$$r_i + r_0 \sqrt{\dfrac{\cos^2(\varphi_i - \beta)}{\cos^2\gamma} + \sin^2(\varphi_i - \beta)}$$

where $r_0$ is the short axis of the fitted ellipse.

Further, the relationship between the alpha envelope boundary $\partial H_\alpha(S)$ and the sampling point polar coordinates $(\rho_i, \varphi_i)$ in step 4 is expressed as:

$$\partial H_\alpha(S) = \sum_{i=1}^{n-1} F(\rho_i, \rho_{i+1}, \varphi_i, \varphi_{i+1})$$

where n is the number of circular profile sampling points, and $\rho_i$ and $\varphi_i$ are the polar diameter and the polar angle of the point $P_i$ in polar coordinates, respectively; F is a non-equal interval morphological filter design rule based on the alpha shape theory.

Further, the establishment process of the four-target optimization model in step 6 includes:

step a: determining the accumulated eccentric error of the kth stage of rotor for n-stage rotor assembly, wherein the accumulated eccentric error of the kth stage of rotor is:

$$\begin{bmatrix} dx_{0-k} \\ dy_{0-k} \\ dz_{0-k} \end{bmatrix} = \sum_{i=1}^{k} \left( \prod_{j=2}^{i} S_{rj-1} S_{xj-1} S_{yj-1} \right) S_{ri}(p_i + dp_i), \; (k = 1, 2, \ldots, n)$$

where $dx_{0-k}$ is the accumulated eccentric error of the center of a circle of a measuring surface of the kth stage of rotor in an X-axis direction for n rotors assembly; $dy_{0-k}$ is the accumulated eccentric error of the center of a circle of the measuring surface of the kth stage of rotor in a Y-axis direction for n rotors assembly; $dz_{0-k}$ is the accumulated eccentric error of the center of a circle of the measuring surface of the kth stage of rotor in a Z-axis direction for n rotors assembly; $p_i$ is an ideal location vector of the center of a circle of a radial measuring surface of the ith stage of rotor; $dp_i$ is a processing error vector of the center of a circle of the radial measuring surface of the ith stage of rotor; $S_{ri}$ is a rotation matrix of the ith stage of rotor rotating by a $\theta_{ri}$ angle around the Z-axis; $S_{r1}$ is a unit matrix; $S_{xj-1}$ is a rotation matrix of a (j−1)th stage rotor and stator base plane rotating by a $\theta_{xj-1}$ angle around the X-axis; $S_{yj-1}$ is a rotation matrix of the (j−1)th stage rotor and stator base plane rotating by a $\theta_{yj-1}$ angle around the Y-axis; $p_i$ is an ideal location vector of the center of a circle of a radial measuring surface of the ith stage of rotor; $dp_i$ is a processing error vector of the center of a circle of the radial measuring surface of the ith stage of rotor; $S_{rj-1}$ is a rotation matrix of the (j−1)th stage of rotor and stator rotating by a $\theta_{rj-1}$ angle around the Z-axis; $S_{r1}$ is a unit matrix;

step b: according to the ISO standard definition of coaxiality, determining the coaxiality for n rotors assembly, wherein the coaxiality for n rotors assembly is expressed as:

$$\text{coaxiality} = \max\{2\sqrt{dx^2_{0-k} + dy^2_{0-k}}, k = 1, 2, \ldots, n\}$$

step c: after multi-stage rotor assembly, determining the amount of unbalance of the nth rotor caused by the eccentric error of each stage of rotor, wherein the amount of unbalance of the nth rotor caused by the eccentric error of each stage of rotor is:

$$\begin{bmatrix} Ux_{0-n} \\ Uy_{0-n} \end{bmatrix} = \begin{bmatrix} m_{0-n} & 0 & 0 \\ 0 & m_{0-n} & 0 \end{bmatrix} \cdot \sum_{i=1}^{n} \left( \prod_{j=2}^{i} S_{rj-1} S_{xj-1} S_{yj-1} \right) S_{ri}(p_i + dp_i)$$

where $Ux_{0-n}$ is the amount of unbalance of a measuring surface of the nth stage of rotor in the X-axis direction after assembly; $Uy_{0-n}$ is the amount of unbalance of the measuring surface of the nth stage of rotor in the Y-axis direction after assembly; $m_{0-n}$ is the mass of the nth stage of rotor after assembly;

step d, enabling the amount of unbalance of the single stage of rotor and the amount of unbalance introduced by the eccentric error of each stage of rotor in the assembly process to be subjected to vector addition to obtain the amount of unbalance of any stage of rotor after multi-stage rotor assembly; then, respectively projecting the amount of unbalance of each stage of rotor to two correction surfaces, and synthesizing the amount of unbalance according to a dynamic balance formula, thereby establishing a prediction model of the amount of unbalance of multiple stages of rotors; subsequently, determining the location of the center of gravity according to the distribution situation of a gravitational field, and further determining the rotational inertia by combining the eccentricity of the mass center relative to the axis of gyration;

step e: by combining the coaxiality for n rotors assembly obtained in step 2, the initial amount of unbalance, the location of the center of gravity and the rotational inertia obtained in step 4 as well as the relationship among the coaxiality for n rotors assembly, the initial amount of unbalance, the location of the center of gravity, the rotational inertia and the angular orientation mounting position, establishing a four-target optimization model of the geometry center, the mass center, the center of gravity and the center of inertia of multiple stages of rotors based on the angular orientation mounting position of each stage of rotor.

Further, the prediction process of the BP neural network in step 7 includes:

step a: setting a learning rate u to be 0.03, and setting the minimum deviation of the training target to be 0.0001;

step b: importing data, and performing normalization processing on the data to enable the data to be normalized;

step c: calculating the weight of 20 neurons in a first hidden layer and the output value of a model;

step d: calculating the weight of 20 neurons in a second hidden layer and the output value of the model;

step e: calculating the output value of the model and the mean square error (MSE) of the sample, and if the MSE does not meet the training target, performing differentiation on the relative weight of the MSE to realize back propagation of errors so as to obtain a gradient;

step f: updating a weight matrix by utilizing the formula $W_1 = W_0 - u \times D_1$;

step g: recalculating the BP neural network prediction model by using the updated weight, and performing continuous iteration until the MSE is less than the minimum deviation of the training target.

Further, the BP neural network is a four-layer BP neural network prediction model taking error factors such as temperature, humidity, tightening torque, orientation error, localization error, amount of unbalance measuring error, rotor height and contact surface radius of each stage of rotor as input variables and taking coaxiality after rotor assembly, initial amount of unbalance, distribution of center of gravity and rotational inertia as output variables; and the BP neural network includes two network hidden layers, and each hidden layer has 20 nodes.

Further, the BP neural network process actually measures 2000 groups of data based on six stages of simulation rotors, and a tool box of the neural network is utilized for training the BP neural network model; the maximum number of training is 1000, the learning factor is set to be 0.03, and the minimum deviation of the training target is set to be 0.0001; and the tool box of the BP neural network automatically divides the input data into training data, cross-validation data and test data, and the training data, the cross-validation data and the test data respectively account for 70%, 15% and 15% of the total amount of data.

A large-scale high-speed rotary equipment vector measuring stack assembly device for realizing the method adopts the following technical scheme: the device includes a base 1, an air flotation shaft system 2, an aligning and tilt regulating workbench 3, precise force sensors 4a, 4b, 4c, a static balance measuring platform 5, an upright column 6, a lower transverse measuring rod 7, a lower telescopic inductive sensor 8, an upper transverse measuring rod 9 and an upper lever type inductive sensor 10; the air flotation shaft system 2 is nested in the center position of the base 1; the aligning and tilt regulating workbench 3 is arranged in the center position of the air flotation shaft system 2; the three precise force sensors 4a, 4b, 4c are uniformly arranged on the aligning and tilt regulating workbench 3; the static balance measuring platform 5 is arranged on the three precise force sensors 4a, 4b, 4c; the upright column 6 is distributed at left side of the air flotation shaft system 2 and is fixedly arranged on the base 1; the upright column 6 is sleeved with the upper transverse measuring rod 9 and the lower transverse measuring rod 7 sequentially from the top to bottom in a mode of movable regulation; the upper lever type inductive sensor 10 is fixedly connected to the upper transverse measuring rod 9; and the lower telescopic inductive sensor 8 is fixedly connected to the lower transverse measuring rod 7.

The present invention has the following beneficial effects.

The large-scale high-speed rotary equipment stack assembly method based on vector minimization of the geometry center, the mass center, the center of gravity and the center of inertia, provided by the present invention, analyzes the sampling angle distribution properties and the measuring error of single-stage rotor circular profile measuring, performs functional filter on the collected circular profile data through a non-equal interval morphological filter, establishes a four-parameter circular profile measuring model by considering four parameter components including the eccentricity of the rotor, the offset of the sensor measuring head, the radius of the sensor measuring ball and the tilt error of the measuring surface in circular profile measuring to accurately estimate the eccentric error, determines the eccentricity after the assembly of the nth stage of rotors according to the transmission process of the localization error and the orientation error of the rotor of an aircraft engine in assembly to obtain a coaxiality prediction model after multi-stage rotor assembly, simultaneously obtains the amount of unbalance introduced by the localization error and the orientation error of each stage of rotor after assembly according to the transmission process of the localization error and the orientation error of the rotor in rotor assembly, respectively projects the introduced amount of unbalance and the amount of unbalance of the single stage of rotor to two correction surfaces, synthesizes the amount of unbalance according to a dynamic balance formula so as to obtain an amount of unbalance prediction model after multi-stage rotor assembly, determines the location of the center of gravity according to the distribution situation of a gravitational field, determines the rotational inertia by combining the eccentricity of the mass center relative to the axis of gyration, finally establishes a four-target optimization model of the geometry center, the mass center, the center of gravity and the center of inertia of multiple stages of rotors based on the angular orientation mounting position of each stage of rotor, and optimizes the angular orientation mounting position of each stage of rotor by utilizing a genetic algorithm to obtain the optimal angular orientation mounting phase of each stage of rotor, thereby realizing optimization of assembly of multiple stages of rotors.

The large-scale high-speed rotary equipment stack assembly device based on vector minimization of the geometry center, the mass center, the center of gravity and the center of inertia, provided by the present invention, can accurately realize the optimized assembly of multiple stages of rotors according to the optimization result, greatly improving assembly precision, assembly accuracy and assembly efficiency.

Figure 1:
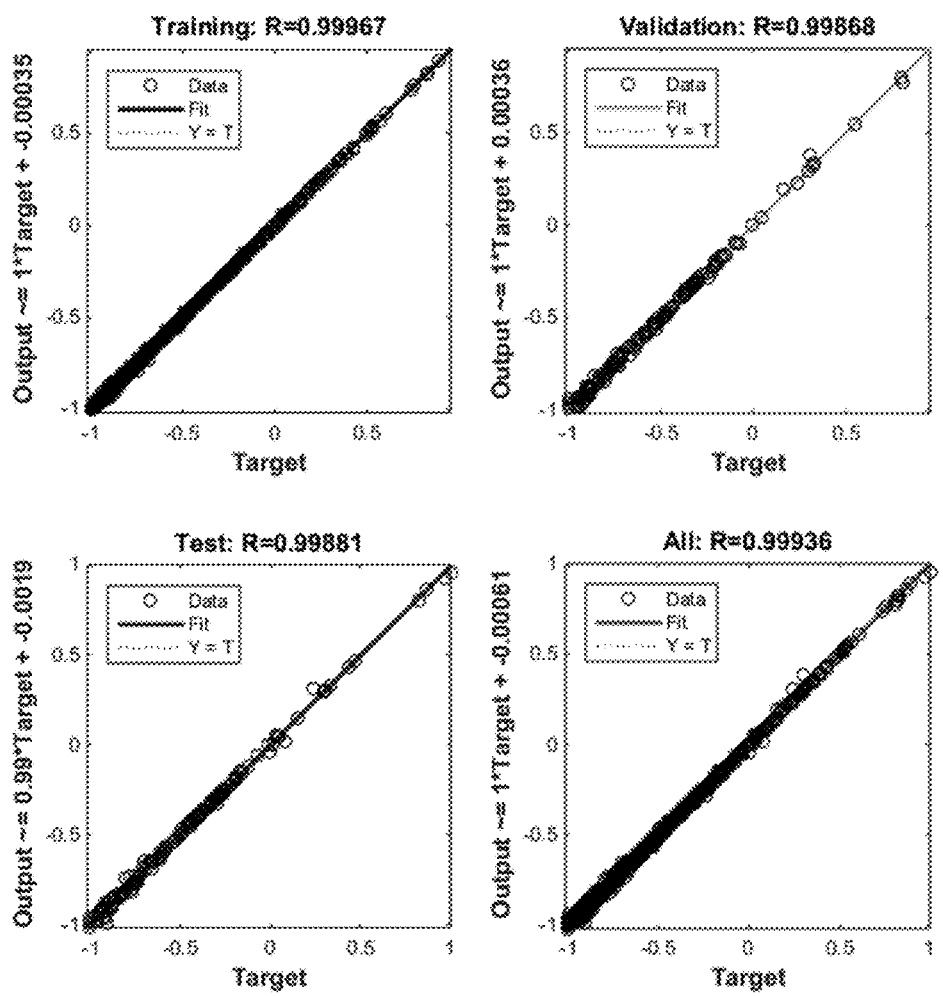
FIG. 1 is a model error regression curve obtained by performing simulation training on the BP neural network according to the present invention for many times.
Figure 2:
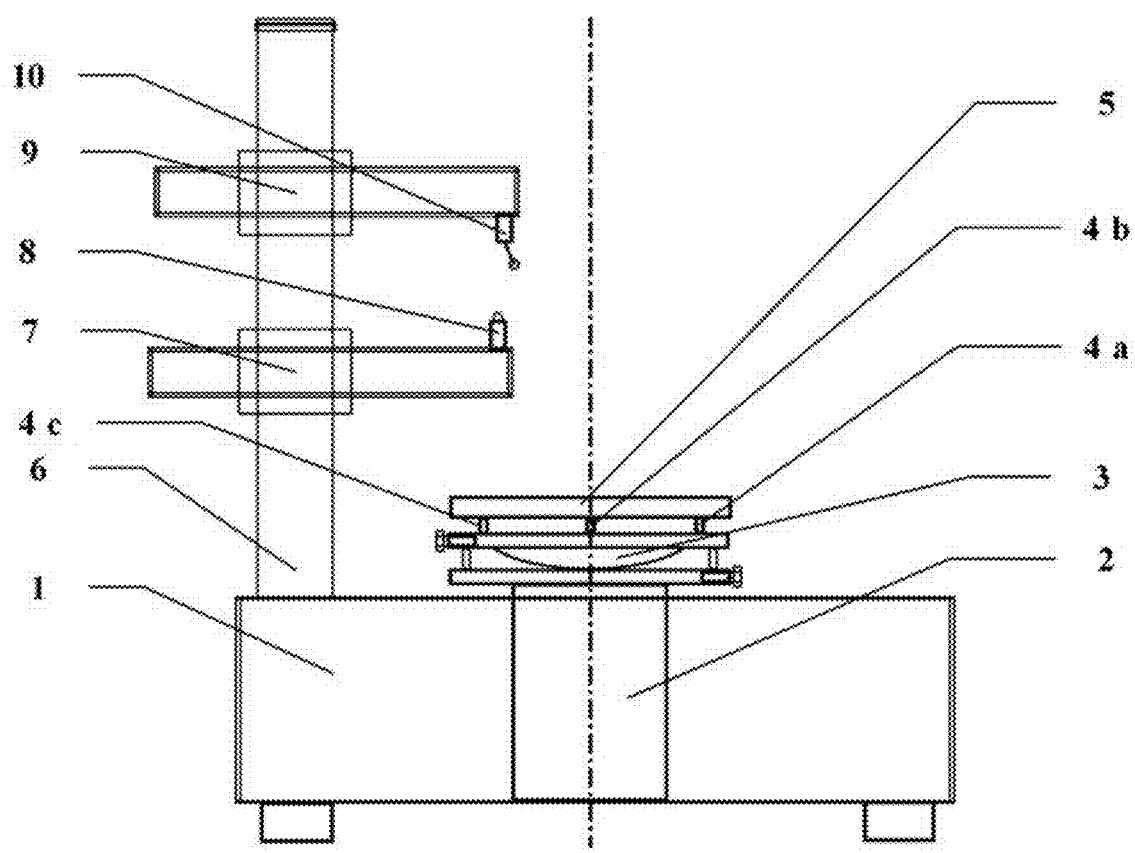
FIG. 2 is a structural schematic diagram of large-scale high-speed rotary equipment vector measuring stack assembly according to the present invention.

(base 1, air flotation shaft system 2, aligning and tilt regulating workbench 3, precise force sensors 4a, 4b, 4c, static balance measuring platform 5, upright column 6, lower transverse measuring rod 7, lower telescopic inductive sensor 8, upper transverse measuring rod 9, upper lever type inductive sensor 10)

DETAILED DESCRIPTION OF THE INVENTION

The present invention is further illustrated by the following specific embodiments, but the present invention is not limited by the embodiments.

Embodiment 1

A large-scale high-speed rotary equipment vector measuring stack assembly method based on vector minimization of the geometry center, the mass center, the center of gravity and the center of inertia adopts the following technical scheme and includes:

step 1: establishing a four-parameter circular profile measuring model for a single stage of rotor, wherein the model includes the eccentric error of the measured single stage of rotor, the offset of a sensor measuring head, the radius of a sensor measuring ball and the tilt error of a measuring surface, and in actual single-stage rotor circular profile measuring, measuring errors (such as the eccentric error and the offset of the sensor measuring head) cause non-equal interval distribution of actual sampling angles, so that the four-parameter circular profile measuring model is utilized for obtaining an actual sampling angle distribution function of the large-scale high-speed rotary equipment, wherein the actual sampling angle distribution function of the large-scale high-speed rotary equipment is:

$$\varphi_i = \theta_i + \arcsin\left(\frac{d + e\sin(\theta_i - \alpha)}{r + r_0\sqrt{\frac{\cos^2(\varphi_i - \beta)}{\cos^2\gamma} + \sin^2(\varphi_i - \beta)}}\right),$$

$$i = 1, 2, \ldots, n$$

where $\varphi_i$ is a sampling angle relative to the geometric center, $\theta_i$ is a sampling angle relative to the center of gyration, d is the offset of the sensor measuring head, e is the eccentricity of the rotor, $\alpha$ is the eccentric angle of the rotor, $r_0$ is a short axis of a fitted ellipse, r is the radius of the sensor measuring head, $\gamma$ is an included angle between an axis of gyration and a geometric axis, $\beta$ is an included angle between the projection of the geometric axis on the measuring plane and the initial direction of measuring, and n is the number of sampling points;

step 2: obtaining a morphological filter based on non-equal interval sampling angles by utilizing the envelope filter principle according to the four-parameter circular profile measuring model for the single stage of rotor, taking any point $P_1$ in a two-dimensional point set S, and enabling the point $P_1$ as a start point and points which are less than $2\alpha$ from the point $P_1$ to constitute a subset $S_1$, wherein S is a two-dimensional space coordinate point set of circular profile sampling points, and $\alpha$ is an alpha disc radius;

step 3: taking any point $P_2$ in the subset $S_1$ to obtain two alpha discs which have a radius $\alpha$ and pass through the point $P_1$ and the point $P_2$, wherein the locus equation of the centers of inner and outer circles of the alpha discs is:

$$\begin{cases} \rho_0 = \sqrt{x_0^2 + y_0^2} \\ \varphi_0 = \arctan\frac{y_0}{x_0} \end{cases} \text{ or } \begin{cases} \rho_{0'} = \sqrt{x_{0'}^2 + y_{0'}^2} \\ \varphi_{0'} = \arctan\frac{y_{0'}}{x_{0'}} \end{cases}$$

where $P_0$ and $P_{0'}$ are the centers of circles of the two alpha discs, respectively; and $$\begin{cases} x_0 = \rho_1\cos\varphi_1 + 0.5(\rho_2\cos\varphi_2 - \rho_1\cos\varphi_1) + H(\rho_2\sin\varphi_2 - \rho_1\sin\varphi_1) \\ y_0 = \rho_1\sin\varphi_1 + 0.5(\rho_2\sin\varphi_2 - \rho_1\sin\varphi_1) + H(\rho_1\cos\varphi_1 - \rho_2\cos\varphi_2) \end{cases}$$

$$\begin{cases} x_{0'} = \rho_1\cos\varphi_1 + 0.5(\rho_2\cos\varphi_2 - \rho_1\cos\varphi_1) - H(\rho_2\sin\varphi_2 - \rho_1\sin\varphi_1) \\ y_{0'} = \rho_1\sin\varphi_1 + 0.5(\rho_2\sin\varphi_2 - \rho_1\sin\varphi_1) - H(\rho_1\cos\varphi_1 - \rho_2\cos\varphi_2) \end{cases}$$

$$H = \sqrt{\frac{\alpha^2}{(\rho_1\cos\varphi_1 - \rho_2\cos\varphi_2)^2 + (\rho_1\sin\varphi_1 - \rho_2\sin\varphi_2)^2} - \frac{1}{4}}$$

$\rho_0$, $\varphi_0$, $\rho_{0'}$, $\varphi_{0'}$, $\rho_1$, $\varphi_1$, $\rho_2$ and $\varphi_2$ are polar diameters and polar angles of points $P_0$, $P_{0'}$, $P_1$ and $P_2$ in polar coordinates, respectively; $x_0$, $y_0$, $x_{0'}$ and $y_{0'}$ are coordinates of points $P_0$ and $P_{0'}$ in an X-axis direction and a Y-axis direction, respectively;

step 4: obtaining the relationship between an alpha envelope boundary $\partial H_\alpha(S)$ and sampling point polar coordinates $(\rho_i,\varphi_i)$ by utilizing the locus equation in step 3, and obtaining the circular profile information of the single stage of rotor according to the relationship between the alpha envelope boundary $\partial H_\alpha(S)$ and the sampling point polar coordinates $(\rho_i,\varphi_i)$;

step 5: when the eccentric error is $e/r_0 < 10^{-3}$ relative to the short axis of the fitted ellipse, performing power series expansion on the four-parameter circular profile measuring model for the single stage of rotor in step 1 so as to obtain a simplified four-parameter circular profile measuring model; the simplified four-parameter circular profile measuring model is:

$$\begin{cases} l_i = e\cos(\theta_i - \alpha) + \Delta r_i + \xi_i - \dfrac{(d + e\sin(\theta_i - \alpha))^2}{2(r + \Delta r_i + \xi_i)} \\ \xi_i = r_0\sqrt{\dfrac{\cos^2(\eta_i)}{\cos^2\gamma} + \sin^2(\eta_i)} \\ \eta_i = \theta_i + \arcsin\left(\dfrac{d + e\sin(\theta_i - \alpha)}{r + r_0 + \Delta r_i}\right) - \beta \end{cases},$$

$$i = 0, 1, 2, \ldots, n$$

where $l_i$ represents the simplified four-parameter circular profile measuring model;

step 6: substituting the filtered circular profile data into the simplified four-parameter circular profile measuring model in step 5, accurately estimating the eccentric error of the single stage of rotor by utilizing the simplified four-parameter circular profile measuring model, and obtaining the eccentric error value of the single stage of rotor; then, establishing a four-target optimization model of the geometry center, the mass center, the center of gravity and the center of inertia of multiple stages of rotors based on the angular orientation mounting position of each stage of rotor by utilizing the vector stack projection theory according to the eccentric error value of the single stage of rotor; and step 7: inputting the rotor assembly result obtained by the four-target optimization model in step 6 into a BP neural network for prediction so as to compensate for the deviation between the model predicted value and the actual measured value.

The four-parameter circular profile measuring model for the single stage of rotor in step 1 is:

$$l_i = \sqrt{(r + \Delta r_i + r_i)^2 - (d + e\sin(\theta_i - \alpha))^2} + e\cos(\theta_i - \alpha) - r,\ i = 0, 1, 2, \ldots, n$$

where $l_i$ is the distance between the sensor measuring head and the measuring center of gyration, $\Delta r_i$ is a surface processing error, $r_i$ is the distance between the ith sampling point of the fitted ellipse and the geometric center, and the specific expression is:

$$r_i = r_0\sqrt{\dfrac{\cos^2(\varphi_i - \beta)}{\cos^2\gamma} + \sin^2(\varphi_i - \beta)}$$

where $r_0$ is the short axis of the fitted ellipse.

The relationship between the alpha envelope boundary $\partial H_\alpha(S)$ and the sampling point polar coordinates $(\rho_i, \varphi_i)$ in step 4 is expressed as:

$$\partial H_\alpha(S) = \sum_{i=1}^{n-1} F(\rho_i, \rho_{i+1}, \varphi_i, \varphi_{i+1})$$

where n is the number of circular profile sampling points, and $\rho_i$ and $\varphi_i$ are respectively the polar diameter and the polar angle of the point $P_i$ in polar coordinates; F is a non-equal interval morphological filter design rule based on the alpha shape theory.

The establishment process of the four-target optimization model in step 6 includes:

step a, in multi-stage rotor assembly, as the eccentric errors of single stages of rotors are transmitted and accumulated so as to influence the accumulated eccentric error after multi-stage rotor assembly, determining the accumulated eccentric error of the kth stage of rotor for n rotors assembly, wherein the accumulated eccentric error of the kth stage of rotor is:

$$\begin{bmatrix} dx_{0-k} \\ dy_{0-k} \\ dz_{0-k} \end{bmatrix} = \sum_{i=1}^{k}\left(\prod_{j=2}^{i} S_{rj-1}S_{xj-1}S_{yj-1}\right)S_{ri}(p_i + dp_i),$$

$$(k = 1, 2, \ldots, n)$$

where $dx_{0-k}$ is the accumulated eccentric error of the center of a circle of a measuring surface of the kth stage of rotor in an X-axis direction for n rotors assembly; $dy_{0-k}$ is the accumulated eccentric error of the center of a circle of the measuring surface of the kth stage of rotor in a Y-axis direction for n rotors assembly; $dz_{0-k}$ is the accumulated eccentric error of the center of a circle of the measuring surface of the kth stage of rotor in a Z-axis direction for n rotors assembly; $p_i$ is an ideal location vector of the center of a circle of a radial measuring surface of the ith stage of rotor; $dp_i$ is a processing error vector of the center of a circle of the radial measuring surface of the ith stage of rotor; $S_{ri}$ is a rotation matrix of the ith stage of rotor rotating by a $\theta_{ri}$ angle around the Z-axis; $S_{r1}$ is a unit matrix; $S_{xj-1}$ is a rotation matrix of a (j−1)th stage rotor and stator base plane rotating by a $\theta_{xj-1}$ angle around the X-axis; $S_{yj-1}$ is a rotation matrix of the (j−1)th stage rotor and stator base plane rotating by a $\theta_{yj-1}$ angle around the Y-axis; $p_i$ is an ideal location vector of the center of a circle of a radial measuring surface of the ith stage of rotor; $dp_i$ is a processing error vector of the center of a circle of the radial measuring surface of the ith stage of rotor; $S_{rj-1}$ is a rotation matrix of the (j−1)th stage of rotor and stator rotating by a $\theta_{rj-1}$ angle around the Z-axis; $S_{r1}$ is a unit matrix;

step b: according to the ISO standard definition of coaxiality, determining the coaxiality for n rotors assembly, wherein the coaxiality for n-stage rotor assembly is expressed as:

$$\text{coaxiality} = \max\{2\sqrt{dx^2_{0-k} + dy^2_{0-k}},\ k = 1, 2, \ldots, n\}$$

step c: after multi-stage rotor assembly, determining the amount of unbalance of the nth rotor caused by the eccentric error of each stage of rotor, wherein the amount of unbalance of the nth rotor caused by the eccentric error of each stage of rotor is:

$$\begin{bmatrix} Ux_{0-n} \\ Uy_{0-n} \end{bmatrix} = \begin{bmatrix} m_{0-n} & 0 & 0 \\ 0 & m_{0-n} & 0 \end{bmatrix} \cdot \sum_{i=1}^{n}\left(\prod_{j=2}^{i} S_{rj-1}S_{xj-1}S_{yj-1}\right)S_{ri}(p_i + dp_i)$$

where $Ux_{0-n}$ is the amount of unbalance of a measuring surface of the nth stage of rotor in the X-axis direction after assembly; $Uy_{0-n}$ is the amount of unbalance of the measuring surface of the nth stage of rotor in the Y-axis direction after assembly; $m_{0-n}$ is the mass of the nth stage of rotor after assembly;

step d, enabling the amount of unbalance of the single stage of rotor and the amount of unbalance introduced by the eccentric error of each stage of rotor in the assembly process to be subjected to vector addition to obtain the amount of unbalance of any stage of rotor after multi-stage rotor assembly; then, respectively projecting the amount of unbalance of each stage of rotor to two correction surfaces, and synthesizing the amount of unbalance according to a dynamic balance formula, thereby establishing a prediction model of the amount of unbalance of multiple stages of rotors; subsequently, determining the location of the center of gravity according to the distribution situation of a gravitational field, and further determining the rotational inertia by combining the eccentricity of the mass center relative to the axis of gyration;

step e: by combining the coaxiality for n rotors assembly obtained in step 2, the initial amount of unbalance, the location of the center of gravity and the rotational inertia obtained in step 4 as well as the relationship among the coaxiality for n rotors assembly, the initial amount of unbalance, the location of the center of gravity, the rotational inertia and the angular orientation mounting position, establishing a four-target optimization model of the geometry center, the mass center, the center of gravity and the center of inertia of multiple stages of rotors based on the angular orientation mounting position of each stage of rotor.

When the four-target optimization model is utilized for predicting the coaxiality after multi-stage rotor assembly, the initial amount of unbalance, the distribution of the center of gravity and the rotational inertia, due to the coupling influence of multiple factors such as temperature and humidity in the assembly environment and tightening torque on the assembly result in the actual assembly process, a deviation exists between the predicted value and the actual value. In order to compensate for the deviation between the model predicted value and the actual measured value, the BP neural network is utilized for predicting the rotor assembly result. The BP neural network is established based on multi-factor coupling properties such as temperature, humidity, tightening torque, orientation error, localization error, amount of unbalance measuring error, rotor height and contact surface radius in the large-scale high-speed rotary equipment assembly process; the BP neural network is a four-layer BP neural network prediction model taking error factors such as temperature, humidity, tightening torque, orientation error, localization error, amount of unbalance measuring error, rotor height and contact surface radius of each stage of rotor as input variables and taking coaxiality after rotor assembly, initial amount of unbalance, distribution of center of gravity and rotational inertia as output variables; and the BP neural network includes two network hidden layers, and each hidden layer has 20 nodes.

The BP neural network process actually measures 2000 groups of data based on six stages of simulation rotors, and a tool box of the neural network is utilized for training the BP neural network model; the maximum training frequency is set to be 1000, the learning factor is set to be 0.03, and the minimum deviation of the training target is set to be 0.0001; and the tool box of the BP neural network automatically divides the input data into training data, cross-validation data and test data, and the training data, the cross-validation data and the test data respectively account for 70%, 15% and 15% of the total amount of data. The prediction execution process of the BP neural network includes:

step a: setting a learning rate u to be 0.03, and setting the minimum deviation of a training target to be 0.0001;

step b: importing data, and performing normalization processing on the data to enable the data to be normalized;

step c: calculating the weight of 20 neurons in a first hidden layer and the output value of a model;

step d: calculating the weight of 20 neurons in a second hidden layer and the output value of the model;

step e: calculating the output value of the model and the mean square error (MSE) of the sample, and if the MSE does not meet the training target, performing differentiation on the relative weight of the MSE to realize back propagation of errors so as to obtain a gradient;

step f: updating a weight matrix by utilizing the formula $W_1 = W_0 - u \times D_1$; and step g: recalculating the BP neural network prediction model by using the updated weight, and performing continuous iteration until the MSE is less than the minimum deviation of the training target.

The results obtained after processing of the BP neural network model are as shown in FIG. 1. It can be seen from the figure that the regression coefficients R of training, cross-validation and test samples are all greater than 0.9, the relativity meets the convergence requirement, the network fitting effect meets the requirement, and intelligent assembly of multiple stages of rotors is realized.

Embodiment 2

A large-scale high-speed rotary equipment vector measuring stack assembly device for realizing the method adopts the following technical scheme: the device includes a base 1, an air flotation shaft system 2, an aligning and tilt regulating workbench 3, precise force sensors 4a, 4b, 4c, a static balance measuring platform 5, an upright column 6, a lower transverse measuring rod 7, a lower telescopic inductive sensor 8, an upper transverse measuring rod 9 and an upper lever type inductive sensor 10; the air flotation shaft system 2 is nested in the center position of the base 1; the aligning and tilt regulating workbench 3 is arranged in the center position of the air flotation shaft system 2; the three precise force sensors 4a, 4b, 4c are uniformly arranged on the aligning and tilt regulating workbench 3; the static balance measuring platform 5 is arranged on the three precise force sensors 4a, 4b, 4c; the upright column 6 is distributed at the left side of the air flotation shaft system 2 and is fixedly arranged on the base 1; the upright column 6 is sleeved with the upper transverse measuring rod 9 and the lower transverse measuring rod 7 sequentially from the top to bottom in a mode of movable regulation; the upper lever type inductive sensor 10 is fixedly connected to the upper transverse measuring rod 9; and the lower telescopic inductive sensor 8 is fixedly connected to the lower transverse measuring rod 7.

Although the present invention has been disclosed in the above exemplary embodiments, it is not intended to limit the present invention. Any person skilled in the art can make various changes and modifications without departing from the spirits and scope of the present invention. Therefore, the scope of protection of the present invention should be defined as in the claims.

The invention claimed is:

1. A large-scale high-speed rotary equipment measuring and intelligent learning assembly method, comprising:

step 1: establishing a four-parameter circular profile measuring model for a single stage of rotor, and obtaining an actual sampling angle distribution function of large-scale high-speed rotary equipment by utilizing the four-parameter circular profile measuring model, wherein the actual sampling angle distribution function of the large-scale high-speed rotary equipment is:

$$\varphi_i = \theta_i + \arcsin\left(\frac{d + e\sin(\theta_i - \alpha)}{r + r_0\sqrt{\frac{\cos^2(\varphi_i - \beta)}{\cos^2\gamma} + \sin^2(\varphi_i - \beta)}}\right),$$

$$i = 1, 2, \ldots, n$$

wherein $\varphi_i$ is a sampling angle relative to the geometric center, $\theta_i$ is a sampling angle relative to the center of gyration, d is the offset of a sensor measuring head, e is the eccentricity of the rotor, $\alpha$ is the eccentric angle of the rotor, $r_0$ is a short axis of a fitted ellipse, r is the radius of the sensor measuring head, $\gamma$ is an included angle between an axis of gyration and a geometric axis, $\beta$ is an included angle between the projection of the geometric axis on a measuring plane and an initial direction of measuring, and n is the number of sampling points;

step 2: obtaining a morphological filter based on non-equal interval sampling angles by utilizing the envelope filter principle according to the four-parameter circular profile measuring model for the single stage of rotor, taking any point $P_1$ in a two-dimensional point set S, and enabling the point $P_1$ as a start point and points which are less than $2\alpha$ from the point $P_1$ to constitute a subset $S_1$, wherein S is a two-dimensional space coordinate point set of circular profile sampling points, and $\alpha$ is an alpha disc radius;

step 3: taking any point $P_2$ in the subset $S_1$ to obtain two alpha discs which have a radius $\alpha$ and pass through the point $P_1$ and the point $P_2$, wherein the locus equation of the centers of inner and outer circles of the alpha discs is:

$$\begin{cases} \rho_0 = \sqrt{x_0^2 + y_0^2} \\ \varphi_0 = \arctan\frac{y_0}{x_0} \end{cases} \text{ or } \begin{cases} \rho_{0'} = \sqrt{x_{0'}^2 + y_{0'}^2} \\ \varphi_{0'} = \arctan\frac{y_{0'}}{x_{0'}} \end{cases}$$

wherein $P_0$ and $P_0'$ are the centers of circles of the two alpha discs respectively; and $$\begin{cases} x_0 = \rho_1\cos\varphi_1 + 0.5(\rho_2\cos\varphi_2 - \rho_1\cos\varphi_1) + H(\rho_2\sin\varphi_2 - \rho_1\sin\varphi_1) \\ y_0 = \rho_1\sin\varphi_1 + 0.5(\rho_2\sin\varphi_2 - \rho_1\sin\varphi_1) + H(\rho_1\cos\varphi_1 - \rho_2\cos\varphi_2) \end{cases}$$

$$\begin{cases} x_{0'} = \rho_1\cos\varphi_1 + 0.5(\rho_2\cos\varphi_2 - \rho_1\cos\varphi_1) - H(\rho_2\sin\varphi_2 - \rho_1\sin\varphi_1) \\ y_{0'} = \rho_1\sin\varphi_1 + 0.5(\rho_2\sin\varphi_2 - \rho_1\sin\varphi_1) - H(\rho_1\cos\varphi_1 - \rho_2\cos\varphi_2) \end{cases}$$

$$H = \sqrt{\frac{\alpha^2}{(\rho_1\cos\varphi_1 - \rho_2\cos\varphi_2)^2 + (\rho_1\sin\varphi_1 - \rho_2\sin\varphi_2)^2} - \frac{1}{4}}$$

$\rho_0$, $\varphi_0$, $\rho_{0'}$, $\varphi_{0'}$, $\rho_1$, $\varphi_1$, $\rho_2$ and $\varphi_2$ are polar diameters and polar angles of points $P_0$, $P_{0'}$, $P_1$ and $P_2$ in polar coordinates, respectively; $x_0$, $y_0$, $x_{0'}$ and $y_{0'}$ are coordinates of points $P_0$ and $P_{0'}$ in an X-axis direction and a Y-axis direction respectively;

step 4: obtaining the relationship between an alpha envelope boundary $\partial H_\alpha(S)$ and sampling point polar coordinates $(\rho_i, \varphi_i)$ by utilizing the locus equation in step 3, and obtaining the circular profile information of the single stage of rotor according to the relationship between the alpha envelope boundary $\partial H_\alpha(S)$ and the sampling point polar coordinates $(\rho_i, \varphi_i)$;

step 5: when the eccentric error is $e/r_0 < 10^{-3}$ relative to the short axis of the fitted ellipse, performing power series expansion on the four-parameter circular profile measuring model for the single stage of rotor in step 1 so as to obtain a simplified four-parameter circular profile measuring model; the simplified four-parameter circular profile measuring model is:

$$\begin{cases} l_i = e\cos(\theta_i - \alpha) + \Delta r_i + \xi_i - \frac{(d + e\sin(\theta_i - \alpha))^2}{2(r + \Delta r_i + \xi_i)} \\ \xi_i = r_0\sqrt{\frac{\cos^2(\eta_i)}{\cos^2\gamma} + \sin^2(\eta_i)} \\ \eta_i = \theta_i + \arcsin\left(\frac{d + e\sin(\theta_i - \alpha)}{r + r_0 + \Delta r_i}\right) - \beta \end{cases}$$

$$i = 0, 1, 2, \ldots, n$$

wherein $l_i$ represents the simplified four-parameter circular profile measuring model;

step 6: substituting the filtered circular profile data into the simplified four-parameter circular profile measuring model in step 5, accurately estimating the eccentric error of the single stage of rotor by utilizing the simplified four-parameter circular profile measuring model, and obtaining the eccentric error value of the single stage of rotor; then, establishing a four-target optimization model of the geometry center, the mass center, the center of gravity and the center of inertia of multiple stages of rotors based on the angular orientation mounting position of each stage of rotor by utilizing the vector stack projection theory according to the eccentric error value of the single stage of rotor;

step 7: inputting the rotor assembly result obtained by the four-target optimization model in step 6 into a BP neural network for prediction so as to compensate for the deviation between the model predicted value and the actual measured value.

2. The large-scale high-speed rotary equipment measuring and intelligent learning assembly method of claim 1, wherein the four-parameter circular profile measuring model for the single stage of rotor in step 1 is:

$$l_i = \sqrt{(r + \Delta r_i + r_i)^2 - (d + e\sin(\theta_i - \alpha))^2} + e\cos(\theta_i - \alpha) - r, \quad i = 0, 1, 2, \ldots, n$$

wherein $l_i$ is the distance between the sensor measuring head and the measuring center of gyration, $\Delta_{ri}$ is a surface processing error, $r_i$ is the distance between an ith sampling point of the fitted ellipse and the geometric center, and the specific expression is:

$$r_i = r_0\sqrt{\frac{\cos^2(\varphi_i - \beta)}{\cos^2\gamma} + \sin^2(\varphi_i - \beta)}$$

wherein $r_0$ is the short axis of the fitted ellipse.

3. The large-scale high-speed rotary equipment measuring and intelligent learning assembly method of claim 1, wherein the relationship between the alpha envelope boundary $\partial H_\alpha(S)$ and the sampling point polar coordinates $(\rho_i, \varphi_i)$ in step 4 is expressed as:

$$\partial H_\alpha(S) = \sum_{i=1}^{n-1} F(\rho_i, \rho_{i+1}, \varphi_i, \varphi_{i+1})$$

wherein n is the number of circular profile sampling points, and $\rho_i$ and $\varphi_i$ are the polar diameter and the polar angle of a point $P_i$ in polar coordinates, respectively; F is a non-equal interval morphological filter design rule based on the alpha shape theory.

4. The large-scale high-speed rotary equipment measuring and intelligent learning assembly method of claim 1, wherein the establishment process of the four-target optimization model in step 6 comprises:

step a: determining the accumulated eccentric error of a kth stage of rotor for n rotors assembly, wherein the accumulated eccentric error of the kth stage of rotor is:

$$\begin{bmatrix} dx_{0-k} \\ dy_{0-k} \\ dz_{0-k} \end{bmatrix} = \sum_{i=1}^{k} \left( \prod_{j=2}^{i} S_{rj-1} S_{xj-1} S_{yj-1} \right) S_{ri}(p_i + dp_i),$$

$(k = 1, 2, \ldots, n)$ wherein $dx_{0-k}$ is the accumulated eccentric error of the center of a circle of a measuring surface of the kth stage of rotor in the X-axis direction for n-stage rotor assembly; $dy_{0-k}$ is the accumulated eccentric error of the center of a circle of the measuring surface of the kth stage of rotor in a Y-axis direction for n rotors assembly; $dz_{0-k}$ is the accumulated eccentric error of the center of a circle of the measuring surface of the kth stage of rotor in a Z-axis direction for n rotors assembly; $p_i$ is an ideal location vector of the center of a circle of a radial measuring surface of the ith stage of rotor; $dp_i$ is a processing error vector of the center of a circle of the radial measuring surface of the ith stage of rotor; $S_{ri}$ is a rotation matrix of the ith stage of rotor rotating by a $\theta_{ri}$ angle around the Z-axis; $S_{xj-1}$ is a rotation matrix of a (j−1)th stage rotor and stator base plane rotating by a $\theta_{xj-1}$ angle around the X-axis; $S_{yj-1}$ is a rotation matrix of the (j−1)th stage rotor and stator base plane rotating by a $\theta_{yj-1}$ angle around the Y-axis; $S_{r\,j-1}$ is a rotation matrix of the (j−1)th stage of rotor and stator rotating by a $\theta_{rj-1}$ angle around the Z-axis; $S_{r1}$ is a unit matrix;

step b: according to the ISO standard definition of coaxiality, determining the coaxiality for n rotors assembly, wherein the coaxiality for n rotors assembly is expressed as:

coaxiality=max$\{2\sqrt{dx^2_{0-k}+dy^2_{0-k}}, k=1,2,\ldots,n\}$ step c: after multi-stage rotor assembly, determining the amount of unbalance of the nth rotor caused by the eccentric error of each stage of rotor, wherein the amount of unbalance of the nth rotor caused by the eccentric error of each stage of rotor is:

$$\begin{bmatrix} Ux_{0-n} \\ Uy_{0-n} \end{bmatrix} = \begin{bmatrix} m_{0-n} & 0 & 0 \\ 0 & m_{0-n} & 0 \end{bmatrix} \cdot \sum_{i=1}^{n} \left( \prod_{j=2}^{i} S_{rj-1} S_{xj-1} S_{yj-1} \right) S_{ri}(p_i + dp_i)$$

wherein $Ux_{0-n}$ is the amount of unbalance of a measuring surface of the nth stage of rotor in the X-axis direction after assembly; $Uy_{0-n}$ is the amount of unbalance of the measuring surface of the nth stage of rotor in the Y-axis direction after assembly; $m_{0-n}$ is the mass of the nth stage of rotor after assembly;

step d, enabling the amount of unbalance of the single stage of rotor and the amount of unbalance introduced by the eccentric error of each stage of rotor in the assembly process to be subjected to vector addition to obtain the amount of unbalance of any stage of rotor after multi-stage rotor assembly; then, respectively projecting the amount of unbalance of each stage of rotor to two correction surfaces, and synthesizing the amount of unbalance according to a dynamic balance formula, thereby establishing a prediction model of the amount of unbalance of multiple stages of rotors; subsequently, determining the location of the center of gravity according to the distribution situation of a gravitational field, and further determining the rotational inertia by combining the eccentricity of the mass center relative to the axis of gyration;

step e: by combining the coaxiality for n rotors assembly obtained in step 2, the initial amount of unbalance, the location of the center of gravity and the rotational inertia obtained in step 4 as well as the relationship among the coaxiality for n rotors assembly, the initial amount of unbalance, the location of the center of gravity, the rotational inertia and the angular orientation mounting position, establishing a four-target optimization model of the geometry center, the mass center, the center of gravity and the center of inertia of multiple stages of rotors based on the angular orientation mounting position of each stage of rotor.

5. The large-scale high-speed rotary equipment measuring and intelligent learning assembly method of claim 1, wherein the prediction process of the BP neural network in step 7 comprises:

step a: setting a learning rate u to be 0.03, and setting the minimum deviation of a training target to be 0.0001;

step b: importing data, and performing normalization processing on the data to enable the data to be normalized;

step c: calculating the weight of 20 neurons in a first hidden layer and the output value of a model;

step d: calculating the weight of 20 neurons in a second hidden layer and the output value of the model;

step e: calculating the output value of the model and the mean square error (MSE) of the sample, and if the MSE does not meet a training target, performing differentiation on the relative weight of the MSE to realize back propagation of errors so as to obtain a gradient;

step f: updating a weight matrix by utilizing the formula $W_1 = W_0 - u \times D_1$; and step g: recalculating the BP model by using the updated weight, and performing continuous iteration until the MSE is less than the minimum deviation of the training target.

6. The large-scale high-speed rotary equipment measuring and intelligent learning assembly method of claim 1, wherein the BP neural network is a four-layer BP neural network prediction model taking error factors such as temperature, humidity, tightening torque, orientation error, localization error, amount of unbalance measuring error, rotor height and contact surface radius of each stage of rotor as input variables and taking coaxiality after rotor assembly, initial amount of unbalance, distribution of center of gravity and rotational inertia as output variables; and the BP neural network comprises two network hidden layers, and each hidden layer has 20 nodes.

7. The large-scale high-speed rotary equipment measuring and intelligent learning assembly method of claim 1, wherein the BP neural network process actually measures 2000 groups of data based on six stages of simulation rotors, and a tool box of the neural network is utilized for training the BP neural network model; the maximum training frequency is set to be 1000, the learning factor is set to be 0.03, and the minimum deviation of the training target is set to be 0.0001; and the tool box of the BP neural network automatically divides the input data into training data, cross-validation data and test data, and the training data, the cross-validation data and the test data respectively account for 70%, 15% and 15% of the total amount of data.

8. A large-scale high-speed rotary equipment measuring and intelligent learning assembly device, wherein the device comprises a base, an air flotation shaft system, an aligning and tilt regulating workbench, precise force sensors, a static balance measuring platform, an upright column, a lower transverse measuring rod, a lower telescopic inductive sensor, an upper transverse measuring rod and an upper lever type inductive sensor;

wherein the air flotation shaft system is nested in the center position of the base;

wherein the aligning and tilt regulating workbench is arranged in the center position of the air flotation shaft system;

wherein the three precise force sensors are uniformly arranged on the aligning and tilt regulating workbench;

wherein the static balance measuring platform is arranged on the three precise force sensors;

wherein the upright column is distributed at the left side of the air flotation shaft system and is fixedly arranged on the base;

wherein the upright column is sleeved with the upper transverse measuring rod and the lower transverse measuring rod sequentially from top to bottom in a mode of movable regulation;

wherein the upper lever type inductive sensor is fixedly connected to the upper transverse measuring rod; and wherein the lower telescopic inductive sensor is fixedly connected to the lower transverse measuring rod.

* * * * *